United States Patent Office 3,330,742
Patented July 11, 1967

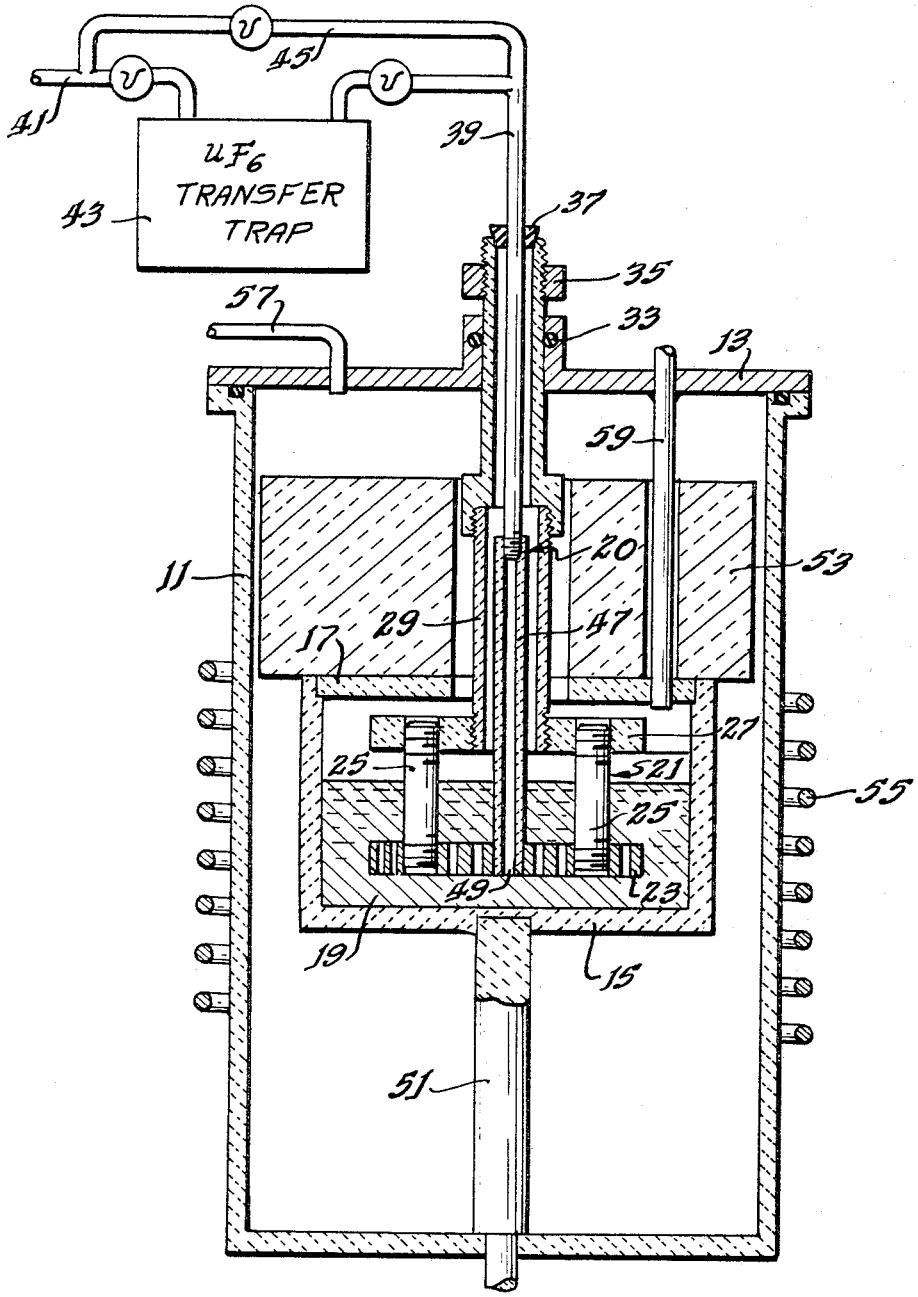

3,330,742
ELECTROLYTIC REDUCTION OF URANIUM HEXAFLUORIDE TO URANIUM METAL IN FUSED SALT
Roger D. Piper, Des Peres, Mo., assignor, by mesne assignments, to the United States of America as represented by the United States Atomic Energy Commission
Filed Oct. 11, 1966, Ser. No. 586,610
5 Claims. (Cl. 204—1.5)

ABSTRACT OF THE DISCLOSURE

Electrolytic reduction of uranium hexafluoride to uranium metal by contacting the uranium hexafluoride with a carbon anode and a molten electrolyte containing uranium tetrafluoride and an alkaline earth fluoride and collecting the molten uranium metal at a cathode.

Contractual origin of the invention

The invention described herein was made in the course of, or under, a contract with the United States Atomic Energy Commission.

This invention relates to a method for reducing uranium hexafluoride to uranium metal. More specifically, it relates to a one-step method for reducing uranium hexafluoride to uranium metal in an electrolytic cell.

Natural uranium as refined from its ores contains only about 0.7% of $U^{235}$ which is the naturally occurring fissionable isotope of uranium. In order that uranium can be used in most operating thermal nuclear reactors, the percentage of $U^{235}$ which is present in the uranium must be increased. The usual means for increasing the $U^{235}$ present in the uranium is by gaseous diffusion. In order that the uranium can go through this gaseous diffusion process, it must first be converted or changed into a gas. This is done by reacting it in various ways with fluorine gas so that the uranium becomes uranium hexafluoride of $UF_6$. In this state it can go through the gaseous diffusion process and have its $U^{235}$ content increased.

After completion of the diffusion process, the uranium is still in a gaseous state as $UF_6$ which is unsuitable for use as a fuel in a nuclear reactor, since nuclear reactors fueled by a gas are not practical at this time.

To obtain uranium metal from $UF_6$ at present requires a rather complex process which involves several steps. First the $UF_6$ must be reacted with hydrogen to produce $UF_4$, which is a powder known as green salt, and HF, a gas. A further reduction of the $UF_4$ to uranium metal requires use of a process known as the bomb reduction method. In this method, a slight excess of magnesium powder is ixed with the $UF_4$ powder and the mixture is charged in a $MgF_2$ slag lined steel reaction vessel. The exothermic reaction is initiated by heating the vessel to 600–400° C. The uranium is heavier than the other reaction products and settles to the bottom of the vessel as a "derby" or "biscuit." To insure a high quality of uranium with a minimum of impurities, the quality of the liner and charged material must be very high. Even so, it is necessary to remelt the uranium in a vacuum to remove gaseous impurities, such as nitrogen, hydrogen, oxygen and fluorides, which are still present.

Between each step in the process, the desired product must be handled and the unwanted by-product removed and disposed of. Each step and occasion upon which the product is moved increases the overall cost of the product due to handling and also increases the cost of the product due to normal loss of the product associated with such handling. A simple means then of lowering costs of uranium would be to devise a simple process which could accomplish the reduction of $UF_6$ to uranium metal in fewer steps, thereby effecting cost savings insofar as handling and product loss are concerned.

An attempt to develop a method for one-step reduction of $UF_6$ to uranium metal has been reported in Industrial and Engineering Chemistry rocess Design and Development 2, 117–121 (1963) by C. D. Scott. In the method described therein, the $UF_6$ gas was sprayed into a reactor containing excess molten sodium. The $UF_6$-Na reaction was very rapid and since the reaction was very significant at or near the $UF_6$ nozzle tip, it necessitated considerable developmental effort to perfect a method for cooling the nozzle tip to prevent melting and corrosion. Another problem encountered was in finding reaction vessel material which could withstand the temperature and corrosiveness of the reactants and reaction products. Because of these problems with the process, no further efforts are known to have been made for further refinement.

I have devised a process for reducing $UF_6$ to uranium metal which requires only one step to accomplish the reduction and in which there is no problem of compatibility of either the reactants or the final products with the materials with which the reaction vessel can be constructed.

Accordingly, it is an object of this invention to provide a method by which the reduction of $UF_6$ to uranium metal can be accomplished by a single process and which requires a minimum amount of handling of the product.

It is a further object of this invention to provide a method by which the reduction of $UF_6$ to uranium metal can be accomplished by a single process which consists of a single step which is compatible with normally available reaction vessel materials and to produce the uranium metal in a liquid form whereby it may be cast directly into an ingot of the desired form.

Basically my invention comprises electrolytically reducing $UF_6$ gas by contacting this gas with a graphite anode through which a current is flowing and with an electrolyte containing $UF_4$ and an alkaline earth fluoride. Carbon tetrafluoride gas is formed at the anode and molten uranium forms as a pool at the cathode.

Reference is now made to the drawing which is a schematic view of an apparatus which has been used to practice this invention. It must be realized that the method of this invention is not limited to this apparatus but can include any apparatus by which the invention can be practiced.

The apparatus consists of a quartz tube 11 which is covered by a lid 13. A graphite crucible 15 topped by a crucible cover 17 is concentrically arranged in said quartz tube. Graphite crucible 15 contains an electrolyte 19 and functions as cathode for the electrolytic reduction of $UF_6$. A graphite anode 21 is disposed above said graphite crucible 15 and consists of a thick round perforated lower plate 23, immersed in the electrotlyte 19, two vertical supports 25 extending upwardly from the lower plate, a horizontal collar 27, and a two-part vertical sleeve 29 extending upwardly from collar 27 through an opening in lid 13, said vertical sleeve 29 being connected to the vertical supports 25 by collar 27. O ring 33 is a gas-tight seal between lid 13 and sleeve 29. The top of sleeve 29 is attached to an anode connector 35.

Extending through a gas-tight stopper 37 into sleeve 29 is a Monel pipe 39 which connects at its upper end to an argon gas line 41 through a $UF_6$ transfer trap 43 and a by-pass line 45. The lower end of pipe 39 is connected at 20 to a graphite pipe 47 which extends through sleeve 29 and plate 23 to terminate in a gas outlet 49.

As shown in the drawing, a cathode connector 51 penetrates quartz tube 11 to provide an electrical connection to graphite crucible 15; insulation 53 of fire brick is provided above crucible 15; and induction coils 55 surround quartz tube 11 to serve as heaters. A gas inlet 57 extends through lid 13, as does off-gas outlet line 59, which also extends through insulation 53 and crucible cover 17 to a point above electrolyte 19.

In the operation of this apparatus, $UF_6$ is first introduced into transfer trap 43 where it is weighed to determine the amount of $UF_6$ present in the trap. This is done in order to determine the amount of $UF_6$ being reacted and to more easily meter the flow of the gas into the cell. Transfer rates of 1–3 gms./minute of $UF_6$ are obtained by heating this trap to about 50° C., which is slightly below the $UF_6$ sublimation temperature of about 56° C., and flowing carrier gas at a rate of about 50 ml./minute through the trap. Argon gas was used in the experiments, although any inert gas would work equally as well. The $UF_6$ could be introduced directly into the cell, but control of the flow of $UF_6$ would be more difficult by that method.

Because of the corrosive reaction of $UF_6$ with the Monel pipe at temperatures above 800° and because the $UF_6$ will only react with graphite to form $UF_4$ at temperatures below 400° C., it was found necessary to control the temperatures in these pipes to within these limits. With this apparatus, it was discovered that by positioning the connection 20 between the two pipes in a location where the temperature was about 500° C. no corrosion or reactions occurred in the Monel or graphite pipes.

The $UF_6$ is carried through the above-mentioned Monel and graphite pipes and through the gas outlet 49 where it bubbles into the electrolyte 19. By using a graphite anode having a large surface area immersed in the electrolyte, it is possible to obtain the required contact between the $UF_6$ gas, the anode and the electrolyte. The perforations in plate 23 are to provide increased surface area. A graphite anode is necessary to provide the carbon to react with the free fluorine formed by the reduction reaction. The most successful anode was an 8-inch diameter by 1-inch thick graphite plate which was used in conjunction with a 10¾-inch diameter cylindrical graphite crucible cathode.

Any alkaline earth fluoride will operate as the electrolyte, for example, barium fluoride, calcium fluoride or strontium fluoride. Lithium fluoride is also included in the fused salt electrolyte in order to lower the resulting temperature to a point below that of uranium. For example, a fused salt electrolyte containing equimolar amounts of barium fluoride and lithium fluoride has a melting point of about 950° C. which is considerably below the melting point, 1130° C., for uranium.

In addition to the alkaline earth fluoride and lithium fluoride, a quantity of $UF_4$ is necessary in the electrolyte so that the "anode effect" might be avoided. This is an interruption of the electrolytic current caused when an insulating film of nonconducting fluorocarbon produced by a decomposition of the electrolyte forms on the anode surface. Generally, it has been found that if the electrolyte initially contains from 5–15% $UF_4$ the anode effect can be controlled. The amount of $UF_4$ which must be maintained in the electrolyte can be controlled by varying the amount of $UF_6$ gas which is introduced into the cell, which will be explained more fully later when the theory of the reduction is discussed. Generally it was found that a satisfactory electrolyte consists of 74% $BaF_2$, 11% LiF and 15% $UF_4$.

The electric current level necessary to effect the reduction of $UF_6$ is maintained at the highest level possible without causing anode effect. Some $UF_4$ must be present in the electrolyte to prevent anode effect, and it was found that with more $UF_4$ present, a higher cathode current density can be maintained and that this higher current density provided an increased current efficiency. However, too much $UF_4$ gave lowered current efficiency. In general, it was found that when 15% $UF_4$ was present in the electrolyte, a cathode current density of 2.5 amps per square inch could be maintained at an average of 5 volts.

Current efficiency, which is a function of the quantity of metal recovered, divided by the theoretical amount of metal which could have been reduced from the amount of current passed through the cell, was found to vary from 5 to 24%. This, as stated earlier, is dependent upon the cathode current density and $UF_4$ content, which must be above a certain minimum. For a cell operated at a given current, current efficiency is optimized by operating with just enough $UF_4$ in the electrolyte to avoid anode effect, which can easily be determined by one skilled in the art. At the end of a run, the cell was allowed to cool with a potential of 3 volts maintained to minimize back-reaction of the metal with the electrolyte.

A sweep gas introduced through line 59, although not actually needed, was used in the cell to ascertain the efficiency of the reaction by removing any unreacted $UF_6$ from the cell to a $CaSO_4$ trap where the amount collected could be weighed. The sweep gas would also remove any unreacted $UF_6$ gas which might remain in the cell and which could react with the container materials and damage the cell. Although helium was used for the laboratory cell, any inert gas works equally as well.

The temperature necessary for the operation of the invention must be high enough so that the uranium will be molten after it is formed, i.e. above 1130° C. Thus any temperature above this minimum, which will be compatible with the equipment, is satisfactory. Generally a temperature of 1130 to 1200° C. was found to be satisfactory.

The theory involved is not completely understood but it is believed that the $UF_6$ is reduced to $UF_4$ when it comes in contact with the graphite of the anode and the electrolyte. The reaction does not appear when the $UF_6$ comes in contact with the graphite alone.

$$2UF_6 + C \xrightarrow{\text{electrolyte}} 2UF_4 + CF_4$$

This reaction proceeds separately from the reaction which further reduces the $UF_4$ to uranium metal. Thus, by carefully controlling the input of $UF_6$ into the cell, a positive control can be maintained over the quantity of $UF_4$ contained in the electrolyte and by preventing depletion of $UF_4$ in the electrolyte the anode effect can be prevented.

The second reaction:

$$UF_4 + C \rightarrow U + CF_4$$

proceeds independently of the first reaction, and indeed, the pure uranium metal can be obtained from the electrolysis of $UF_4$ in the electrolyte without the addition of any $UF_6$.

*Experiment*

The cell was assembled as shown in the drawing. It was purged overnight with argon to remove air, and the argon flow was maintained during the run to remove any unreacted $UF_6$. The cell was heated to 1160° C. Electrolysis was commenced at 450 amps and the $UF_6$ flow was started after 50 minutes using 50 cc. per minute of carrier gas flow with a trap temperature of about 50° C. to give a $UF_6$ flow of about 2.5 grams per minute through an electrolyte depth of about 2 inches. Electrolysis continued for a total of 445 minutes with variations in current as required by limits imposed by the anode effect. At completion of the run the current was down to 320 amps due to depletion of the $UF_4$ from the electrolyte. This was caused by the production of the uranium metal at a faster rate than the $UF_6$ was allowed to enter the cell.

The initial electrolyte consisted of 74% $BaF_2$, 11% LiF and 15% $UF_4$. The final electrolyte contained the same ratio of $BaF_2$ and LiF but contained only 6% $UF_4$. The total $UF_6$ gas fed was 950 grams and the metal obtained was 1645 grams of uranium metal. Because the reduction of the $UF_4$ proceeds separately and apart from the $UF_6$ reduction, this explains the apparent discrepancies in the reaction rates obtained between the amount of $UF_6$ which entered the cell and the total amount of uranium metal which was formed. The current efficiency for the completed reduction was found to be 23%.

The table below lists the results of two additional runs which were made under conditions similar to those used in the experiment. In no run was there any appreciable loss of $UF_6$ and there was no indication of any reaction of $UF_6$ with the insulating fire brick or other materials inside the cell enclosure. The metal was, in every case, well coalesced with an exceptionally smooth surface at the salt-metal interface.

TABLE

All runs were made at 1,160° C.
Electrolyte was 74% $BaF_2$, 11% LiF, 15% $UF_4$.
All conditions were the same as those given for the experiment.

| $UF_6$ Used (Grams) | Average Current (Amps) | Final $UF_4$ Conc. (w/o) | Metal Produced (Grams) | Current Efficiency (Percent) |
|---|---|---|---|---|
| 455 | 357 | 13 | 410 | 10 |
| 260 | 365 | a 6 | 805 | 24 | a Initial $UF_4$ content was 13%.

It is to be understood that the invention is not to be limited to the details given herein but that it may be modified within the scope of the appended claims.

What is claimed is:
1. A method for reducing uranium hexafluoride to uranium metal comprising: bubbling uranium hexafluoride gas across a carbon anode immersed in a molten electrolyte composed of $UF_4$ and an alkaline earth fluoride, while simultaneously passing a direct electric current between said anode and a carbon cathode whereby uranium is formed at said cathode.

2. The method of claim 1 wherein the electrolyte compound consists of $UF_4$ and equimolar amounts of alkaline earth fluoride and lithium fluoride.

3. The method of claim 2 wherein the electrolyte consists of 1–15% $UF_4$ and equimolar amounts of $BaF_2$ and LiF.

4. The method of claim 3 wherein the electrolyte consists of 15% $UF_4$, 74% $BaF_2$ and 11% LiF.

5. The method of claim 1 wherein the electrolyte temperature is from 1130 to 1200° C.

No references cited.

REUBEN EPSTEIN, *Primary Examiner.*